(12) United States Patent
Kang et al.

(10) Patent No.: US 9,031,380 B2
(45) Date of Patent: May 12, 2015

(54) INFORMATION STORAGE MEDIUM STORING TEXT-BASED SUBTITLE, AND APPARATUS AND METHOD FOR PROCESSING TEXT-BASED SUBTITLE

(75) Inventors: Man-Seok Kang, Suwon-si (KR); Seong-jin Moon, Suwon-si (KR); Kil-soo Jung, Hwaseong-si (KR); Sung-wook Park, Seoul (KR); Hyun-kwon Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 13/447,441

(22) Filed: Apr. 16, 2012

(65) Prior Publication Data

US 2012/0201514 A1  Aug. 9, 2012

Related U.S. Application Data

(63) Continuation of application No. 10/956,342, filed on Oct. 4, 2004, now Pat. No. 8,204,361.

(30) Foreign Application Priority Data

Oct. 4, 2003 (KR) .......................... 10-2003-069023
Mar. 10, 2004 (KR) .......................... 10-2004-016103

(51) Int. Cl.
  *H04N 5/92* (2006.01)
  *G11B 27/10* (2006.01)
  (Continued)

(52) U.S. Cl.
  CPC .......... *G11B 27/105* (2013.01); *H04N 5/44504* (2013.01); *H04N 5/9206* (2013.01);
  (Continued)

(58) Field of Classification Search
  USPC .......... 386/230, 239, 240, 244–246; 348/461, 348/468
  See application file for complete search history.

(56) References Cited

U.S. PATENT DOCUMENTS 5,497,241 A  3/1996 Ostrover et al.
5,760,838 A  6/1998 Adams et al.
(Continued)

FOREIGN PATENT DOCUMENTS

CN  1374803  10/2002
EP  0 791 925 A2  8/1997
(Continued)

OTHER PUBLICATIONS

U.S. Appl. No. 10/956,342, filed Oct. 4, 2004, Man-Seok Kang et al., Samsung Electronics Co., Ltd.
(Continued)

*Primary Examiner* — Hung Dang
*Assistant Examiner* — Mishawn Dunn
(74) *Attorney, Agent, or Firm* — NSIP Law

(57) ABSTRACT

An information storage medium storing subtitle text-based information, and a method and apparatus utilizing same, process a subtitle The information storage medium includes: dialog information which contains script text information of the subtitle and information specifying an output type of the script text; and presentation information which contains style information used to convert the script text into a bitmap format through rendering. With this structure, the amount of data required for a subtitle and the amount of data that should be processed when a subtitle is output may be greatly reduced.

12 Claims, 13 Drawing Sheets

(51) Int. Cl.

| | | |
|---|---|---|
| *H04N 5/445* | (2011.01) | |
| *H04N 9/82* | (2006.01) | |
| *H04N 21/234* | (2011.01) | |
| *H04N 21/235* | (2011.01) | |
| *H04N 21/43* | (2011.01) | |
| *H04N 21/435* | (2011.01) | |
| *H04N 21/488* | (2011.01) | |
| *H04N 21/84* | (2011.01) | |
| *H04N 21/8543* | (2011.01) | |
| *H04N 21/8545* | (2011.01) | |
| *H04N 21/858* | (2011.01) | |
| *H04N 5/85* | (2006.01) | |
| *H04N 9/804* | (2006.01) | |

(52) U.S. Cl.
CPC ....... *H04N9/8233* (2013.01); *H04N 21/23412* (2013.01); *H04N 21/235* (2013.01); *H04N 21/4307* (2013.01); *H04N 21/435* (2013.01); *H04N 21/4884* (2013.01); *H04N 21/84* (2013.01); *H04N 21/8543* (2013.01); *H04N 21/8545* (2013.01); *H04N 21/8583* (2013.01); *G11B 2220/2541* (2013.01); *H04N 5/85* (2013.01); *H04N 5/9205* (2013.01); *H04N 9/8042* (2013.01); *H04N 9/8227* (2013.01)

(56) References Cited

U.S. PATENT DOCUMENTS

| | | | |
|---|---|---|---|
| 5,786,864 | A | 7/1998 | Yamamoto |
| 5,805,153 | A | 9/1998 | Nielsen |
| 6,046,778 | A | 4/2000 | Nonomura et al. |
| 6,233,389 | B1 | 5/2001 | Barton et al. |
| 6,345,147 | B1 | 2/2002 | Mimura et al. |
| 6,661,467 | B1 | 12/2003 | Van Der Meer et al. |
| 7,020,839 | B1 | 3/2006 | Hosoda |
| 7,376,338 | B2 | 5/2008 | Kim et al. |
| 2001/0053280 | A1 | 12/2001 | Yamauchi et al. |
| 2002/0122136 | A1 | 9/2002 | Safadi et al. |
| 2002/0194618 | A1 | 12/2002 | Okada et al. |
| 2003/0099464 | A1 | 5/2003 | Oh et al. |
| 2003/0161615 | A1 | 8/2003 | Tsumagari et al. |
| 2004/0081434 | A1 | 4/2004 | Jung et al. |
| 2005/0019018 | A1 | 1/2005 | Kim et al. |
| 2008/0062314 | A1 | 3/2008 | Yoo et al. |

FOREIGN PATENT DOCUMENTS

| | | |
|---|---|---|
| JP | 6-176019 A | 6/1994 |
| JP | 10-208446 A | 8/1998 |
| JP | 2000-39892 | 2/2000 |
| JP | 2000-138908 A | 5/2000 |
| JP | 2000-259640 A | 9/2000 |
| JP | 2001-078149 A | 3/2001 |
| JP | 2002-027386 A | 1/2002 |
| JP | 2002-229985 A | 8/2002 |
| JP | 2002-369154 A | 12/2002 |
| JP | 2003-078835 A | 3/2003 |
| JP | 2003-134440 A | 5/2003 |
| JP | 2004-194131 A | 7/2004 |
| KR | 10-2001-0001725 A | 1/2001 |
| KR | 2002-64463 A | 8/2002 |
| KR | 10-2003-0030554 A | 4/2003 |
| KR | 10-2005-0012328 A | 2/2005 |
| RU | 2 129 758 | 4/1999 |
| WO | WO 02/052565 | 7/2002 |
| WO | WO 03/056560 A1 | 7/2003 |
| WO | WO 03/077249 | 9/2003 |
| WO | WO 2004/036574 A1 | 4/2004 |
| WO | WO 2005/074400 A2 | 8/2005 |
| WO | WO 2005/076276 A1 | 8/2005 |
| WO | WO 2005/083708 A1 | 9/2005 |

OTHER PUBLICATIONS

U.S. Appl. No. 11/971,330, filed Jan. 9, 2008, Man-Seok Kang et al., Samsung Electronics Co., Ltd.
U.S. Appl. No. 11/971,323, filed Jan. 9, 2008, Man-Seok Kang et al., Samsung Electronics Co., Ltd.
Office Action issued on Jan. 6, 2012, in counterpart Chinese Patent Application No. 200480029006.6.
Microsoft Corporation, "Understanding Sami 1.0" Oct. 2001, Internet Citation [online], URL: http://msdn2.microsoft.com/en-us/library/ms971327(d=printer).aspx.
Japanese Office Action issued on Nov. 1, 2011, in counterpart Japanese Application No. 2010-278285 (5 pages, including English translation).
Korean Notice of Allowance issued May 25, 2007, in counterpart Korean Application No. 10-2004-0016103 (5 pages, including English translation of the first page).
"Summons to attend oral proceedings pursuant to rule 115(1)EPC," issued on Jul. 20, 2011, in counterpart European Patent Application No. 08160687.3 (6 pages in English).
Non Final Rejection issued on Aug. 2, 2011, in counterpart Japanese Patent Application No. 2009-219744 (6 pages, including English translation).
Japanese Office Action issued on Sep. 14, 2010, in corresponding Japanese Patent Application No. 2006-532080 (3 pages, and English translation).
Chinese Office Action issued on Apr. 22, 2010, in counterpart Chinese Patent Application No. 20040029006.6 (4 pages, and English translation).
Russian Decision of Grant issued on Feb. 2, 2010, in corresponding Russian Application No. 2007141939 (7 pages, and English translation).
Office Action dated Aug. 11, 2009, in counterpart Russian Patent Application No. 200714139 (and English translation).
Japanese Office Action issued on Jun. 23, 2009, in counterpart Japanese Patent Application.
Office Action issued Jan. 21, 2009, in Russian Patent Application No. 2007141939.
Decision of Grant issued on Sep. 4, 2007 by Russian Patent Office for Russian Patent Application No. 2006115338.
Search Report issued on Sep. 27, 2007, by the European Patent Office for European Patent Application No. 04788500.9.
Office Action issued May 30, 2007, by the Russian Federal Federal Service for Intellectual Property, Patents and Trademarks re: Russian Patent Application No. 2006115338/28 (6 pages).
Office Action issued on Feb. 14, 2007, by the Korean Intellectual Property Office for Korean Patent Application No. 2004-16103.
Blue-Ray Disc Founders, "White Paper Blu-Ray Disc Format: 2 B Audio Visual Application Format Specifications for BD-Rom." Aug. 2004, Internet Citation [online], URL:http://www.blu-raydisc.com/assets/downloadablefile/2b_bdrom_audiovisualapplication-12841.pdf.
Partial machine English translation of JP 2003-134440, May 2003, obtained by USPTO on Nov. 19, 2009, 14 pages.

FIG. 3A

```
<styleset>
  <stylegroup name="Title">
    <style name="normal font" font="gothic.ttf" color="YUV" background="YUVT"
    size="50pt" position="x1,y1" align="center" direction="1" region="l1,t1,w1,h1"
    lineheight="60px" />
    <style name="large font" font="arial.ttf" color="YUV" background="YUVT"
    size="60pt" position="x2,y2" align="center" direction="1" region="l2,t2,w2,h2"
    lineheight="70px" />
  </stylegroup>
  <stylegroup name="Script">
    <style name="normal font" font="gothic.ttf" color="YUV" background="YUVT"
    size="12pt" position="x3,y3" align="left" direction="1" region="l3,t3,w3,h3"
    lineheight="15px" />
    <style name="large font" font="arial.ttf" color="YUV" background="YUVT"
    size="20pt" position="x4,y4" align="left" direction="1" region="l4,t4,w4,h4"
    lineheight="23px" />
  </stylegroup>
  <stylegroup name="Casting">
    <style name="normal font" font="gothic.ttf" color="YUV" background="YUVT"
    size="25pt" position="x5,y5" align="center" direction="1" region="l5,t5,w5,h5"
    lineheight="30px" />
    <style name="large font" font="arial.ttf" color="YUV" background="YUVT"
    size="30pt" position="x6,y6" align="center" direction="1" region="l6,t6,w6,h6"
    lineheight="35px" />
  </stylegroup>
</styleset>
```

FIG. 3B

```
<styleset>
  <stylegroup name="Small">
    <style name="Title" font="gothic.ttf" color="YUV" background="YUV" size="50pt"
     position="x1,y1" align="center" direction="1" region="t1,t1,w1,h1" lineheight="60px" />
    <style name="Script" font="arial.ttf" color="YUV" background="YUV" size="20pt"
     position="x2,y2" align="center" direction="1" region="t2,t2,w2,h2" lineheight="25px" />
    <style name="Casting" font="tahoma.ttf" color="YUV" background="YUV" size="30pt"
     position="x3,y3" align="center" direction="1" region="t3,t3,w3,h3" lineheight="35px" />
  </stylegroup>
  <stylegroup name="Normal">
    <style name="Title" font="gothic.ttf" color="YUV" background="YUV" size="60pt"
     position="x4,y4" align="center" direction="1" region="t4,t4,w4,h4" lineheight="70px" />
    <style name="Script" font="arial.ttf" color="YUV" background="YUV" size="30pt"
     position="x5,y5" align="center" direction="1" region="t5,t5,w5,h5" lineheight="35px" />
    <style name="Casting" font="tahoma.ttf" color="YUV" background="YUV" size="40pt"
     position="x6,y6" align="center" direction="1" region="t6,t6,w6,h6" lineheight="45px" />
  </stylegroup>
  <stylegroup name="Large">
    <style name="Title" font="gothic.ttf" color="YUV" background="YUV" size="70pt"
     position="x7,y7" align="center" direction="1" region="t7,t7,w7,h7" lineheight="80px" />
    <style name="Script" font="arial.ttf" color="YUV" background="YUV" size="40pt"
     position="x8,y8" align="center" direction="1" region="t8,t8,w8,h8" lineheight="45px" />
    <style name="Casting" font="tahoma.ttf" color="YUV" background="YUV" size="50pt"
     position="x9,y9" align="center" direction="1" region="t9,t9,w9,h9" lineheight="55px" />
  </stylegroup>
</styleset>
```

FIG. 4A

```
<StyleSet> stylegroup
  name="Title"
  font="gothic.ttf"
  color="YUV"
  background="YUVT"
  align="center"
  region="l1,t1,w1,h1"
  lineheight="60px"

style
      name="normal font"
      size="60pt"
      position="x2,y2"
      direction="1"

style
      name="small font"
      size="50pt"
      position="x1,y1"
      direction="1"

style
      name="large font"
      size="70pt"
      position="x3,y3"
      direction="1"

stylegroup
  name="Script"
  font="gothic.ttf"
  color="YUV"
  background="YUVT"
  align="left"
  region="l2,t2,w2,h2"
  lineheight="15px"

style
      name="normal font"
      size="12pt"
      position="x5,y5"
      direction="1"

style
      name="small font"
      size="9pt"
      position="x4,y4"
      direction="1"

style
      name="large font"
      size="15pt"
      position="x6,y6"
      direction="1"

stylegroup
  name="Casting"
  font="gothic.ttf"
  color="YUV"
  background="YUVT"
  align="center"
  region="l3,t3,w3,h3"
  lineheight="30px"

style
      name="normal font"
      size="25pt"
      position="x8,y8"
      direction="1"

style
      name="small font"
      size="20pt"
      position="x7,y7"
      direction="1"

style
      name="large font"
      size="30pt"
      position="x9,y9"
      direction="1"

</StyleSet>
```

FIG. 4B

```
<StyleSet> stylegroup
  name="Title"
  font="gothic.ttf"
  color="YUV"
  background="YUVT"
  align="center"
  region="l1,t1,w1,h1"
  lineheight="60px"
  size="60px"
  position="x2,y2"
  direction="1"

style
      name="small font"
      size="50pt"
      position="x1, y1"
      direction="1"

style
      name="large font"
      size="70pt"
      position="x3,y3"
      direction="1"

stylegroup
  name="Script"
  font="gothic.ttf"
  color="YUV"
  background="YUVT"
  align="left"
  region="l2,t2,w2,h2"
  lineheight="15px"
  size="12px"
  position="x5,y5"
  direction="1"

style
      name="normal font"
      size="9pt"
      position="x4,y4"
      direction="1"

style
      name="large font"
      size="15pt"
      position="x6,y6"
      direction="1"

stylegroup
  name="Casting"
  font="gothic.ttf"
  color="YUV"
  background="YUVT"
  align="center"
  region="l3,t3,w3,h3"
  lineheight="30px"
  size="25px"
  position="x8,y8"
  direction="1"

style
      name="normal font"
      size="20pt"
      position="x7,y7"
      direction="1"

style
      name="large font"
      size="30pt"
      position="x9,y9"
      direction="1"

</StyleSet>
```

INFORMATION STORAGE MEDIUM STORING TEXT-BASED SUBTITLE, AND APPARATUS AND METHOD FOR PROCESSING TEXT-BASED SUBTITLE

CROSS-REFERENCE TO RELATED APPLICATIONS

This application is a continuation of U.S. patent application Ser. No. 10/956,342, which claims the priorities of Korean Patent Application No. 2003-69023, filed on Oct. 4, 2003, and No. 2004-16103, filed on Mar. 10, 2004 in the Korean Intellectual Property Office, the disclosures of which are incorporated herein in their entireties by reference.

BACKGROUND OF THE INVENTION

1. Field of the Invention

The present invention relates to a subtitle, and more particularly, to a text based subtitle, and an apparatus and method for processing the subtitle.

2. Description of the Related Art

A conventional subtitle is generated in the form of a bitmap image and is included in an MPEG stream. Since the subtitle has a bitmap image format, it is inconvenient to generate the subtitle, and a user has to passively accept a variety of attributes of the subtitle defined and provided by a subtitle producer. That is, a user cannot select the style, of the subtitle, such as the color of text, the size of the text, or the output direction of the text. Accordingly, a user watches a subtitle with a monotonous style.

Generally, a subtitle of a movie uses some typical formats without frequent changes in the output style, such as changes in text color, text position, text size, and text shape. To render text, each character needs diverse information regarding its color, size, position and shape. If this rendering information is added to each sentence of a subtitle, it provides an advantage that a different style may be specified for each sentence. However, in a movie script which uses only some typical styles, the advantage of the capability of providing various styles is outweighed by the disadvantage that the amount of data required for a subtitle and the amount of data to be processed increase.

SUMMARY OF THE INVENTION

The present invention provides an information storage medium storing a text based subtitle.

The present invention also provides a subtitle processing apparatus and method by which the subtitle may be output in a variety of ways.

According to an aspect of the present invention, an information storage medium storing multimedia data includes: audio/visual (AV) data; and subtitle data comprising script text data that is output in synchronization with the AV data, and output style information in a text format specifying the output type of the script text.

The subtitle data may be recorded in the form of a markup document or in the form of binary data.

According to another aspect of the present invention, an information storage medium storing text based subtitle information includes: dialog information comprising script text information of the subtitle and information specifying an output type of the script text; and presentation information which contains style information used to render and display the script text.

The dialog information and/or the presentation information may be recorded in the form of a markup document or in the form of binary data.

The dialog information may include: script text data; a start time that indicates when the script text is to begin being displayed; an end time that indicates when the display of the script text is to end; and style data that specifies a display style to be used when the script text is rendered.

The presentation information may include at least one stylegroup in which display style information is recorded, and a stylegroup that includes at least one style in which information to be used for rendering and a display style of script text is recorded.

The stylegroup may include style information that cannot be changed by a user, and the at least one style includes style information that is changed by a user.

The style information included in a style selected by the user may be applied to the style information included in the stylegroup in which the selected style is included to change the output type of script text.

The style information included in the selected style may replace, may be added to, or may be subtracted from, style information included in the stylegroup in which the selected style is included.

The script text included in the dialog information may specify one of the stylegroups and the user may select one of the at least one styles included in the specified stylegroup, and, by using information recorded in the specified stylegroup and information recorded in the selected style, the script text may be displayed.

The script text included in the dialog information may specify one of a plurality of styles included in the stylegroup, and the user may select one of the at least one stylegroup, and by using information recorded in the specified style and information recorded in the selected stylegroup, the script text may be displayed.

According to still another aspect of the present invention, a text subtitle processing apparatus includes: a text subtitle parser which extracts presentation information and dialog information from text based subtitle data; and a text layout/font renderer which, by referring to the presentation information, renders the extracted dialog information, and generates an image of script text.

The apparatus may further include: a buffer which reads text based subtitle data and font data from a disc and stores the data; and a presentation engine which reads the rendered script text image and bitmap type script text data, generates a graphic image by combining a rendered script text image and the bitmap type script text data.

According to yet still another aspect of the present invention, a text subtitle processing method includes: reading and storing text based subtitle data and font data; extracting presentation information and dialog information from the subtitle data; rendering script text and generating a text image by using the extracted presentation information and dialog information; reading subtitle data in the form of a bitmap image; combining the subtitle data with the rendered text image; and outputting the combined image.

According to a further aspect of the present invention, a computer readable recording medium has stored thereon a computer program of the method.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which:

FIG. 3A illustrates a markup document defining stylegroups in accordance with an embodiment of the present invention;

FIG. 3B illustrates another markup document defining stylegroups in accordance with an embodiment of the present invention;

FIG. 4A illustrates a markup document in which basic style information is defined in a stylegroup in accordance with an embodiment of the present invention;

FIG. 4B illustrates another markup document in which basic style information is recorded in a stylegroup in accordance with an embodiment of the present invention;

DETAILED DESCRIPTION OF THE PREFERRED EMBODIMENTS

Figure 1:
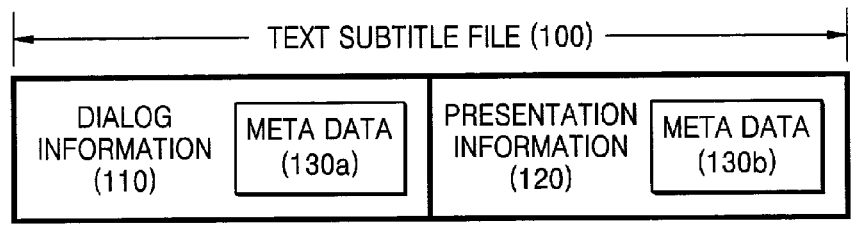
FIG. 1 is a diagram illustrating the structure of a text based subtitle file in accordance with an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1, a text based subtitle file 100 includes dialog information 110, presentation information 120, and meta data 130A and 130B.

The dialog information 110 includes script text, the output start time of the text, the output end time, stylegroup or style information to be used to render text, text change effect information such as fade-in/fade-out, and a formatting code for text.

The formatting code includes code to express text in bold, code to express text in Italics, code to underline, code to indicate a line change, and or the like.

The presentation information 120 includes style information to be used to render script text and is formed with a plurality of stylegroups. A stylegroup is a bundle of styles in which style information is recorded.

A style includes information to be used to render and output script text onto a screen. Examples of such information are the name of a style, fonts, text colors, background colors, text size, a text output region, the start position of text output, an output direction, an alignment method, and on the like.

Depending on which information is defined as a style and as a stylegroup, the scope of attributes that a user may change varies, and a method to specify style information will be explained below.

The meta data 130A and 130B is additional information regarding moving pictures, and includes information required to perform additional functions other than outputting a subtitle.

Figure 2:
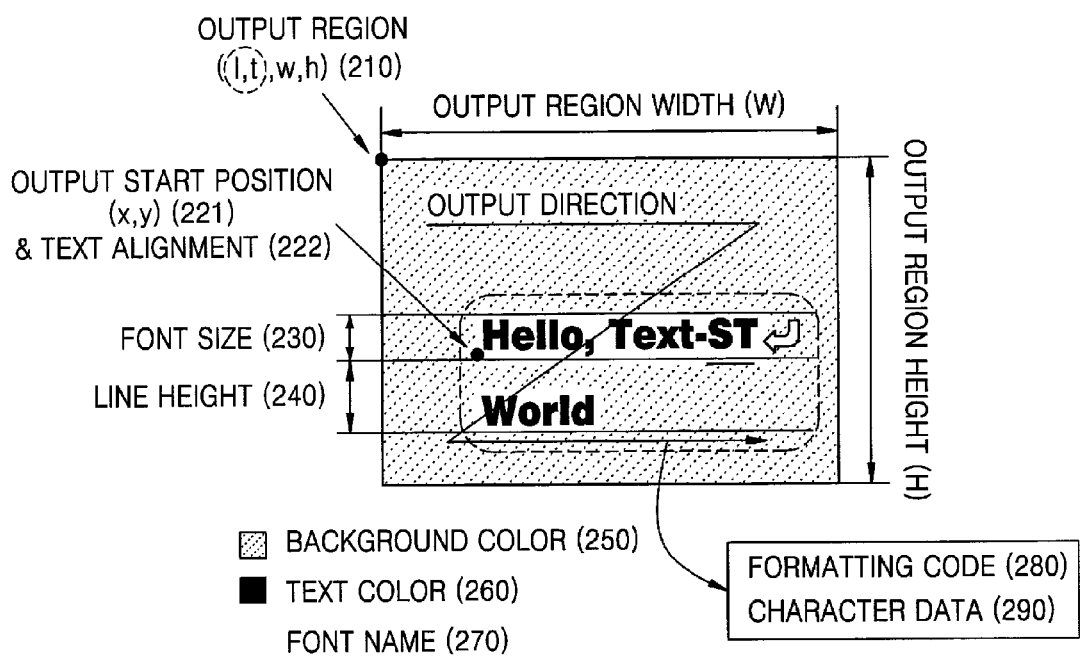
FIG. 2 is a diagram illustrating information required for rendering script text, and text output rendered according to the information in accordance with an embodiment of the present invention.

FIG. 2 is a diagram illustrating information required to render script text, and a screen rendered and output according to the information.

Output region information (l, t, w, h) 210 indicates a region in which text is to be output, and indicates that the region has coordinates (l, t) as a start position, with a width w and a height h. Output start position information (x, y) 220 indicates a reference point when text is output on the screen, and indicates that the reference point should be within region (l, t, w, h). Text alignment information 222 specifies the alignment method of the text. The text may be left-justified, center-justified or right-justified. When the text is left-justified, it extends rightward from the output start position (x,y). When the text is center-justified, it is centered around the output start position (x,y). When the text is right-justified, it extends leftward from the output start position (x,y). In FIG. 2, an example is shown in which the text is output in a left-justified manner.

Font size information 230 indicates the size of text to be output. Line height information 240 indicates line spacing of text. Background color information 250 defines the background color of the output region (l, t, w, h). Text color information 260 defines the color of text to be output. A font name 270 specifies the font to be used for text rendering.

A formatting code 280 and character data 290 are included in the dialog information 110. The formatting code 280 may include code for line changes, bolding, Italicizing, and underlining text, and the character data 290 is script text information to be displayed as the subtitle. The output direction of text may be defined as (left->right, top->bottom) or (top->bottom, right->left). In FIG. 2, the output direction is (left->right, top->bottom). The various information described above, excluding the formatting code 280 and the character data 290, is included in the presentation information 120.

There are a variety of methods of expressing information required for text rendering in a text based subtitle. By defining a structure in which each piece of information is recorded, a binary format structure may be formed, or a markup format corresponding to the information structure may be used.

Unlike the markup document in which the information is recorded as text, information stored in the binary format is represented by a series of binary data in predetermined byte units. That is, for example, a predetermined number of first bytes may be used for the name of a style, the next bytes for a font, and the next bytes for text colors. In this manner, information required for rendering is recorded in a binary format. Hereinafter, information structure will be explained as an example.

There are a variety of methods of forming a style and a stylegroup to indicate style information to be used to render and display each script sentence included in the dialog information 101.

In a method, each script sentence included in the dialog information 110 specifies a stylegroup and a user selects one of the styles included in the specified stylegroup. In another method, a user selects a stylegroup, and each script sentence included in the dialog information 110 specifies one of a plurality of styles included in the stylegroup. Thus, all information required to render a script sentence is included in a style and a producer may change any piece of style information to be used to render an output script according to a user's selection. That is, if a user changes the output style of a script, all pieces of information may be changed according to style information provided by the producer.

The various cases described above will now be explained in more detail with reference to FIGS. 3A through 6B. FIG. 3A illustrates a markup document defining stylegroups in accordance with an embodiment of the present invention. The presentation information is recorded in the form of a styleset, and the styleset includes a plurality of stylegroups defined by a producer. Each of the stylegroups has a name attribute indicating the name of each group, and each group is identified by the stylegroup name indicated by the name attribute. The stylegroup is a bundle of attribute information used to output a subtitle according to a style desired by the producer.

For example, if a producer wants the subtitle of a movie title to be output with a large font size at the center of a screen, the subtitle to be output on the bottom of the screen with a font size that does not affect viewing of the movie, and the subtitle of actors at the ending part of the movie to be center-justified on the entire screen, then the producer divides a style set into three stylegroups, "Title", "Script", and "Casting", defines each of the stylegroups, and assigns one of the three stylegroups defined in the presentation information to each script recorded in the dialog information of the subtitle file. These stylegroups cannot be changed by a user who is watching the movie.

Each of the styles includes styles in which information required to render text is recorded. A style includes a name to identify the style and various information items required to render text. In a stylegroup, a plurality of styles may be defined, and it is preferable that the number of styles and style names defined in each stylegroup be identical for all of the stylegroups. Since the first style among the plurality of styles defined in a stylegroup may be selected as a default, or a default style may be selected by a producer, a style selected as a default is applied to text rendering when a first subtitle is output on the screen, and if the style is changed arbitrarily by a user when the movie is reproduced, then the style specified by the user is applied to the text rendering thereafter.

FIG. 3B is markup document defining stylegroups in accordance with an embodiment of the present invention. Referring to FIG. 3B, Title, Script, and Casting are three classifications of a subtitle and are defined as styles. The stylegroups including these three styles are classified as Small, Normal, and Large according to the output style of the script text. In each script sentence of dialog information, a style defined in presentation information is specified. In this case, since a first stylegroup may be selected as a default or a default stylegroup can be selected by a producer, a style indicated by each script sentence of dialog information among styles included in the stylegroup selected as a default, is applied to text rendering when a first subtitle is output on the screen, and if the stylegroup is changed by a user when the movie is reproduced, then a style included in the stylegroup specified by the user is applied to the text rendering thereafter.

When presentation information is defined as shown in FIGS. 3A and 3B, if a user changes the style, all style information items change. However, depending on the case, changing only part of the style information may be more efficient, and for this, presentation information may be defined as shown in FIGS. 4A and 4B.

FIG. 4A is a markup document in which basic style information is defined in a stylegroup in accordance with an embodiment of the present invention. Unlike the presentation information shown in FIGS. 3A and 3B, in FIG. 4A a stylegroup includes information that does not change when a script output style is changed by a user. Also, the stylegroup includes one or more styles which include style information that may be changed by user's selection, and each style is identified by a name attribute.

Referring to FIG. 4A, a styleset includes three types of stylegroups, identified by "Title", "Script", and "Casting". Each of the stylegroups includes font, color, background, align, region, and lineheight information maintaining fixed values even when a style is changed by a user, and also includes three styles, "normal font", "small font", and "large font", having size, position and direction information whose values change when a style is changed by the user. A style may have a default attribute used to indicate a default style selected by a producer, or a first style may be selected as a default.

In this case, font, color, background, align, region and lineheight style information included in a stylegroup and size, position, and direction style information included in a style selected by the user or in a default style are utilized to form a complete set of style information to be used to render script text.

FIG. 4B is another markup document in which basic style information is defined in a stylegroup in accordance with an embodiment of the present invention. As in FIG. 4A, a stylegroup having presentation information shown in FIG. 4B includes all style information required to render script text. Also, the stylegroup includes one or more styles, which include style information that may be changed by a user's selection, and each style is identified by a name attribute.

Referring to FIG. 4B, a styleset includes three types of stylegroups, identified by "Title", "Script", and "Casting". Each of the stylegroups includes font, color, background, align, region, lineheight, size, position, and direction information to be used to render a script, and includes two styles, "small font" and "large font", which include size, position, and direction information, whose values change when a style is changed by the user.

When there is no change to be input by the user, to form a complete set of style information to be used to render script text, only font, color, background, align, region, lineheight, size, position, and direction style information items included in a stylegroup are used. If a style is changed by the user, size, position, and direction information included in the selected style are applied to the size, position, and direction information, and the output style of the script is changed.

At this time, the values included in the stylegroup may be replaced by the values included in the selected style, or the values included in the selected style may be added to the values included in the stylegroup. When the latter method is used, the values of size, position, and direction attributes included in the style may be expressed as positive or negatives numbers, and the values included in the stylegroup may be added to, or subtracted from, the numbers.

Figure 5A:
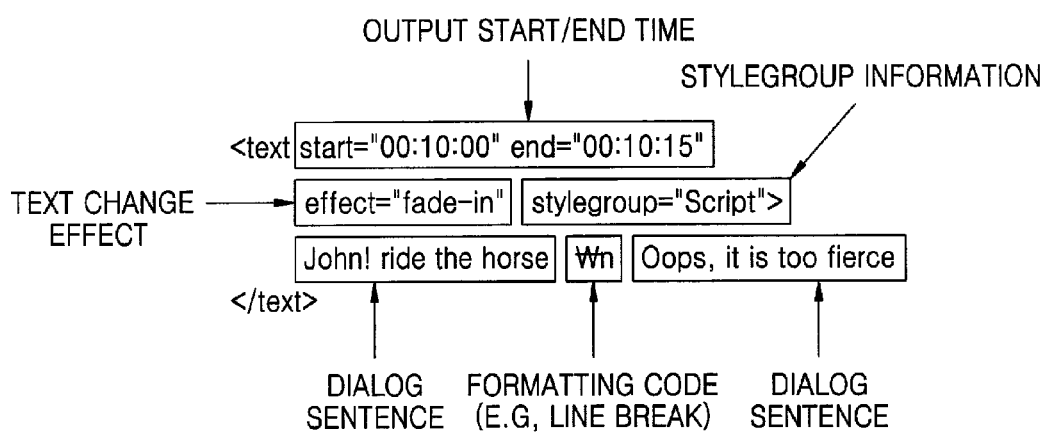
FIG. 5A illustrates an example of a markup language tag used to display a subtitle in accordance with an embodiment of the present invention.

FIG. 5A illustrates an example of a markup tag used to display a subtitle in accordance with an embodiment of the present invention. A <text> tag is used as a unit to classify scripts to be output on the screen. Attribute information included in the <text> tag includes "start," which indicates a time when the output of text starts, and "end," which indicates a time when output ends, as time information for screen output, "effect," which indicates change effects to be applied to text such as fade-in/fade-out, and "stylegroup", which indicates style information to be used to render text. Also, a script to be output on the screen is recorded in the <text> tag.

Referring to FIG. 5A, the script text, "John! ride . . . ", is rendered using a default style among a plurality of styles included in a stylegroup "Script", or style information specified by the user, and by applying a "fade-in" effect, the text is displayed at the start time "00:10:00" and gradually becomes clearer until the end time, "00:10:15".

Figure 5B:
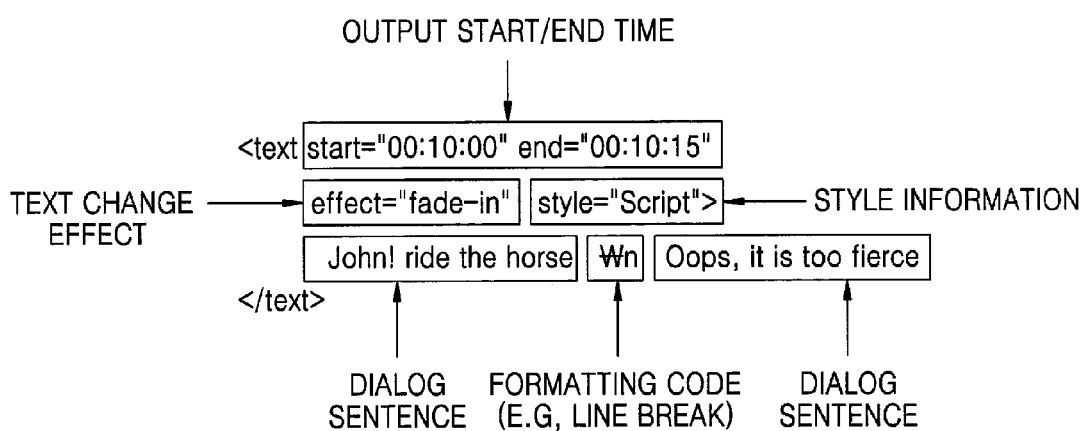
FIG. 5B illustrates another example of a markup language tag used to display a subtitle in accordance with an embodiment of the present invention.

FIG. 5B illustrates another example of a markup language tag used to display a subtitle in accordance with an embodiment of the present invention. Referring to FIG. 5B, a <text> tag specifies a style instead of a stylegroup render script text. In this case, the script text included in the <text> tag is rendered using a default style "Script" among a plurality of styles included in a stylegroup specified by the user.

Figure 6A:
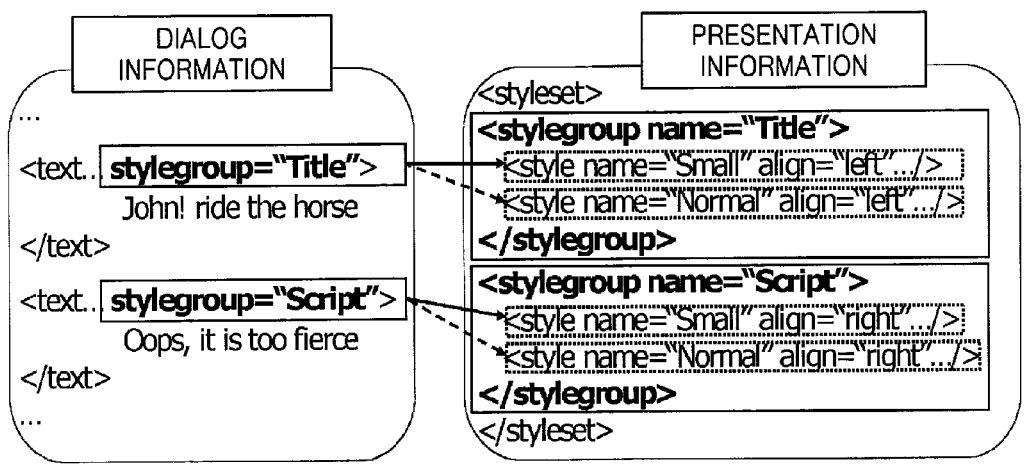
FIG. 6A illustrates a relationship between dialog information and presentation information in accordance with an embodiment of the present invention.

FIG. 6A illustrates a relationship between dialog information and presentation information in accordance with the present invention. As described above with reference to FIG. 5A, each <text> tag, which includes dialog information, has a stylegroup field that indicates style information to be used to render text. The stylegroup field indicates one of a plurality of stylegroups stored in a styleset of presentation information, and among the styles included in the specified stylegroup, a default style or a style specified by the user provides information required to render text.

Referring to FIG. 6A, two <text> tags indicate stylegroups "Title" and "Script", respectively. Each of the two <text> tags corresponds to one of the styles included in the corresponding stylegroup "Title" or "Script" recorded in the presentation information.

Figure 6B:
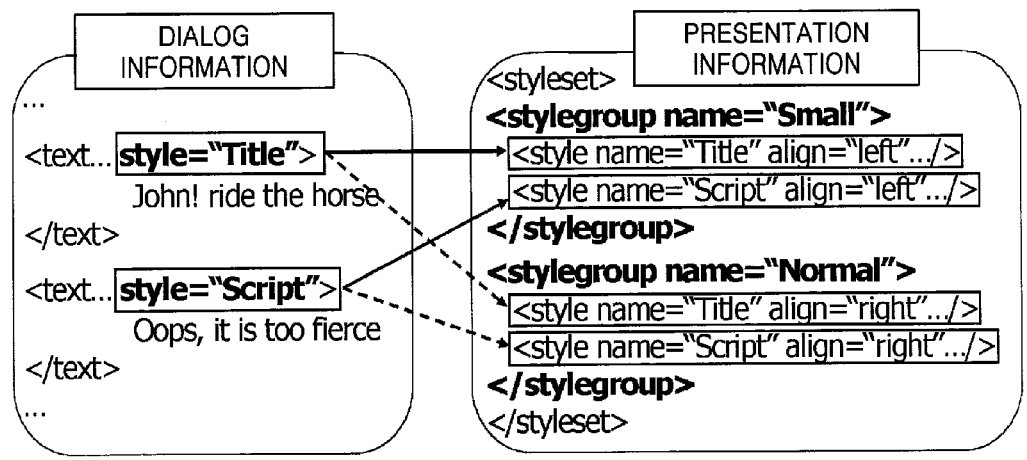
FIG. 6B illustrates another relationship between dialog information and presentation information in accordance with an embodiment of the present invention.

FIG. 6B illustrates another relationship between dialog information and presentation information in accordance with an embodiment of the present invention. Each <text> tag indicates a style, not a stylegroup, as text rendering information, and the corresponding style information is recorded as one of a plurality of styles included in a plurality of stylegroups stored in presentation information. Referring to FIG. 6B, two <text> tags, which include dialog information indicating style "Title" and "Script", respectively, are included in one of the stylegroups "Small" and "Normal" recorded in the presentation information.

Figure 7A:
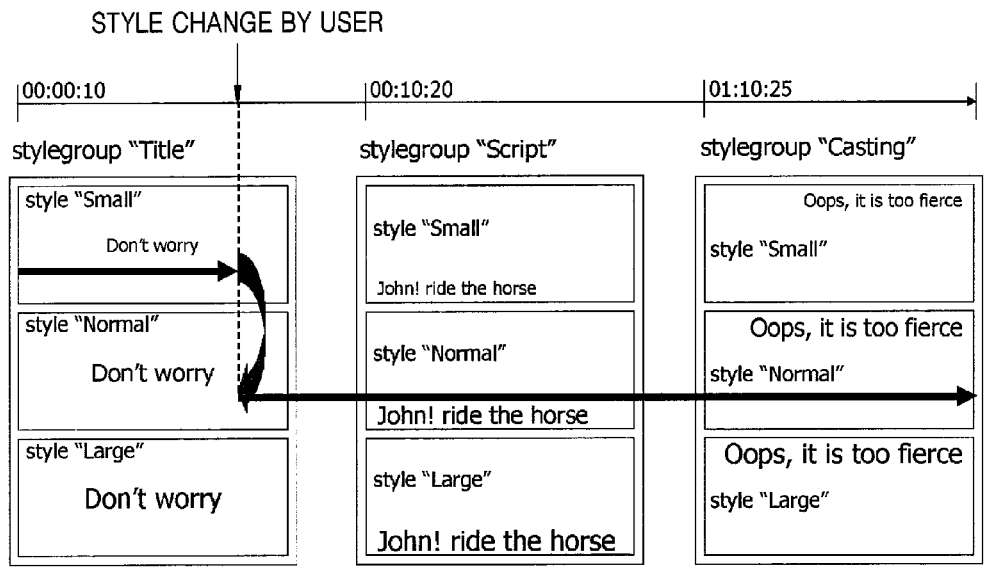
FIG. 7A is a diagram to illustrate how a style is changed by a style change command in accordance with an embodiment of the present invention.

A user operation and an application program interface (API) for the user to change a style will now be explained in detail with reference to FIGS. 7A and 7B. FIG. 7A is a diagram illustrating how a style is changed by a style change command. Referring to FIG. 7A, stylegroups "Title", "Script", and "Casting" are defined with each of the stylegroups, including styles "Small", "Normal", and "Large". The stylegroup "Title" uses center-justification, and outputs text in blue, the stylegroup "Script" uses left-justification from the bottom left-hand side and outputs text in black, and the stylegroup "Casting" uses right-justification from the top right-hand side and outputs text in red. The styles "Small", "Normal", and "Large" have style information indicating output in small-sized letters, medium-sized letters, and large-sized letters, respectively.

At time "00:10:00", stylegroup "Title" is used as information to render text, and the default style "Small" included in the stylegroup "Title" is used as the style information. When the text style is changed into the style "Normal" by the user during reproduction of the movie, the style "Normal" of stylegroup "Title" is used as style information. Also, when the stylegroup changes at the time "00:10:20" with the progress of the movie, the style "Normal" of the stylegroup "Script" is used, and when the stylegroup changes into "Casting" at the time "01:10:25", the style "Normal" selected by the user is continuously applied using the stylegroup "Casting".

Figure 7B:
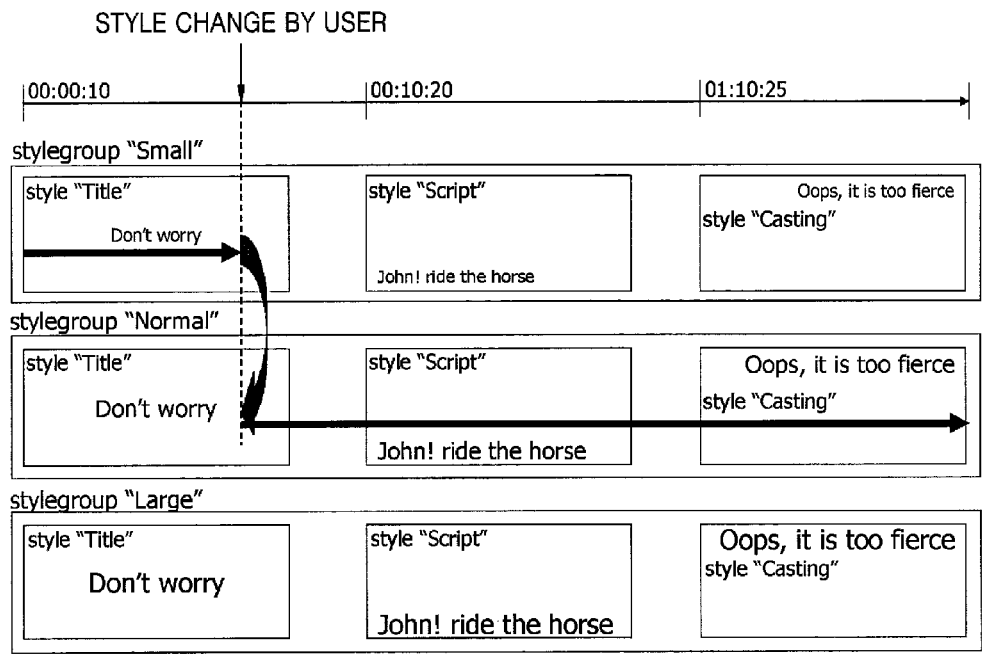
FIG. 7B is a diagram to illustrate how a stylegroup is changed by a stylegroup change command in accordance with an embodiment of the present invention.

FIG. 7B is a diagram illustrating how a stylegroup is changed by a stylegroup change command. Referring to FIG. 7B, stylegroups "Small", "Normal", and "Large" are defined, and each stylegroup includes styles "Title", "Script", and "Casting". At time "00:10:00", style information of the style "Title" included in default stylegroup "Small" is used as information to render text. When the stylegroup is changed from "Small" into "Normal" by the user during the reproduction of the movie, the style "Title" of the stylegroup "Normal" is used as style information. Also, when the style changes from "Title" into "Script" at the time becomes "00:10:20" with the progress of the movie, the style "Script" of the stylegroup "Normal" is used, and when the style is changed to "Casting" at the time "01:10:25", the style "Casting" included in the stylegroup "Normal" specified by the user is applied.

Figure 8A:
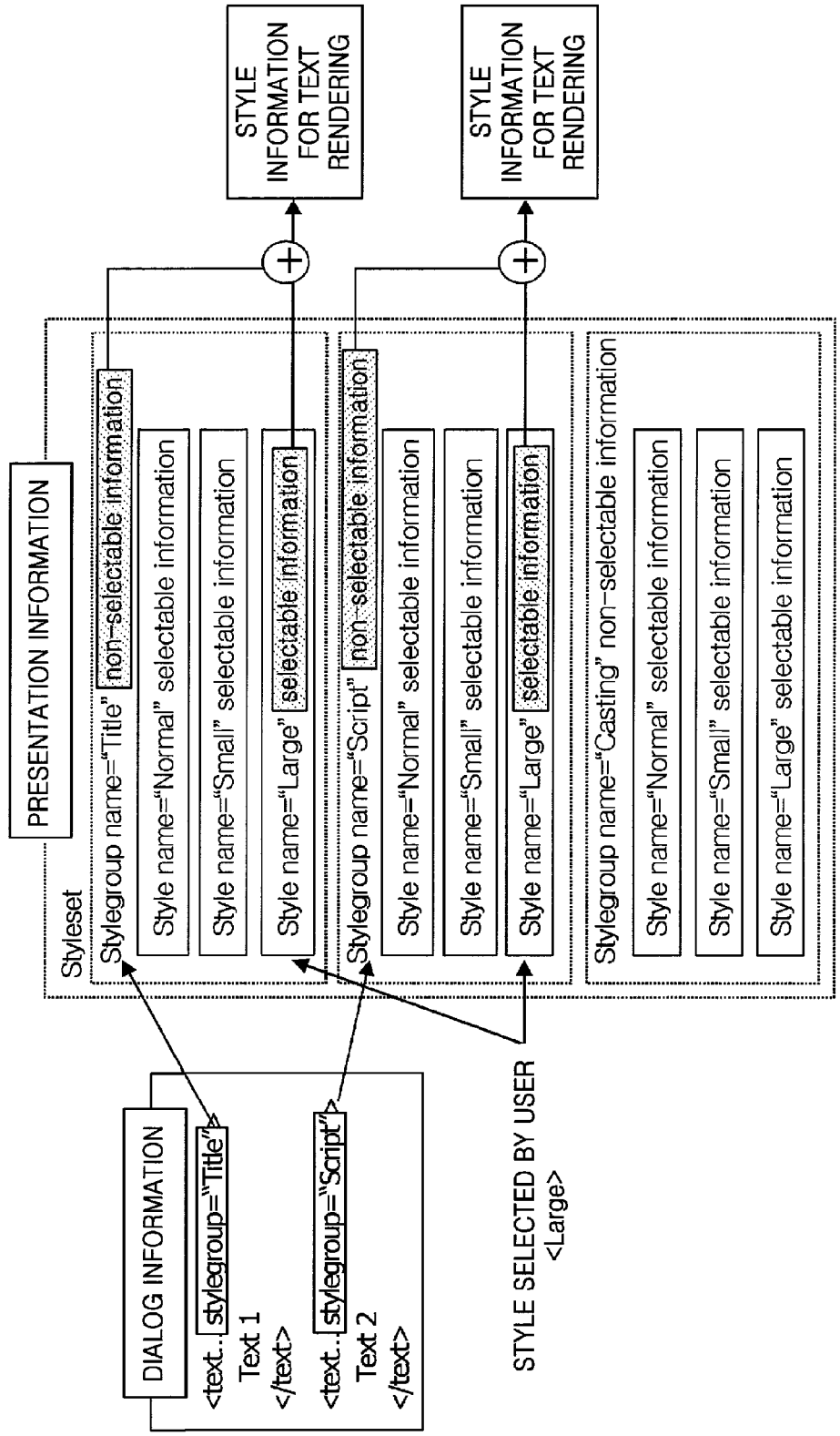
FIG. 8A is a diagram illustrating how style information required for rendering each script item is selected for presentation information formed as shown in FIG. 4A.

FIG. 8A is a diagram illustrating how style information required to render each script item is selected for presentation information formed, as shown in FIG. 4A. Each script of dialog information indicates one of one or more stylegroups included in a styleset. Also, one of one or more styles included in each of the stylegroups is selected, and if there is no user selection, a style "Normal" is selected as a default, and when there is a user selection, a corresponding style is selected.

A process of forming style information to be used to render script "Text 1" will now be explained. Since the script "Text 1" indicates a stylegroup "Title", non-selectable information that is included in the stylegroup "Title" and is not changed by user selection is selected. If a style "Large" is selected by the user, selectable information that is included in the style is selected. Then, the non-selectable information of the stylegroup "Title" and the selectable information of the style "Large" of the stylegroup "Title" are combined to form a complete set of style information.

A process of forming style information to be used to render script "Text 2" will now be explained. First, since the script "Text 2" indicates a stylegroup "Script", non-selectable information that is included in the stylegroup "Script" and is not changed by user selection is selected. If a style "Large" is selected by the user, selectable information that is included in the style "Large" is selected. Then, the non-selectable information of the stylegroup "Script" and the selectable information of the style "Large" of the stylegroup "Script" are combined to form a complete set of style information.

Figure 8B:
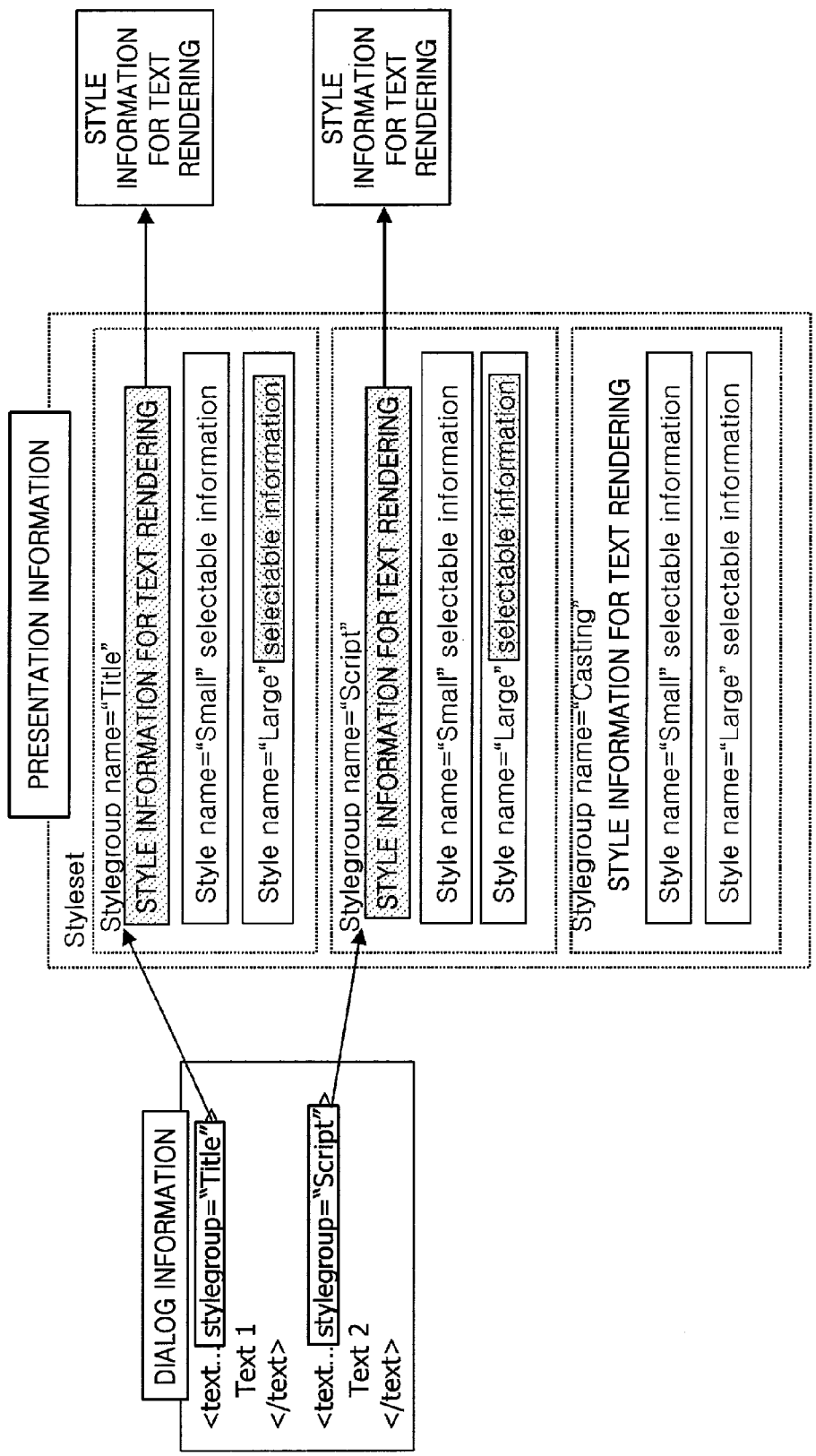
FIGS. 8B and 8C are diagrams illustrating how style information required for rendering each script item is selected for presentation information formed as shown in FIG. 4B.
Figure 8C:
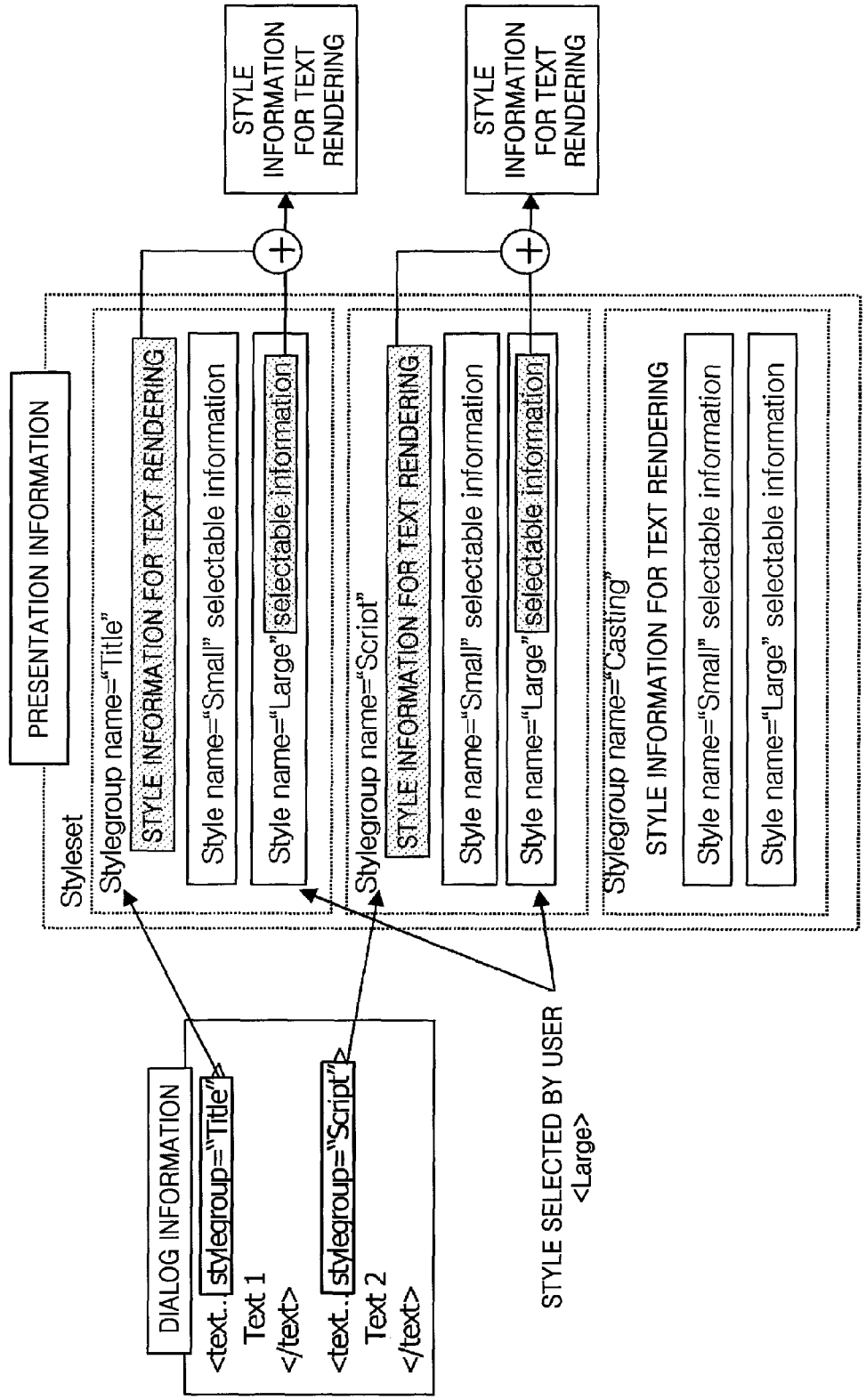

A process of forming style information required to render each script item in the presentation information formed as shown in FIG. 4B will now be explained with reference to FIGS. 8B and 8C. FIGS. 8B and 8C are diagrams illustrating how style information required to render each script item is selected for the presentation information formed as shown in FIG. 4B.

FIG. 8B will be used to illustrate a process of forming a complete set of style information required to render script text when the style is not changed by the user. Each script of dialog information indicates one of one or more stylegroups included in a styleset. When there is no change in the style by the user, all style information items (information for text rendering) required for script text included in the stylegroup indicated by a script are used to form a complete set of style information. When there is a style change by the user, one of one or more styles included in each stylegroup is selected, and information included in the style selected by the user is applied to the information to render text included in the stylegroup to form a complete set of style information.

Referring to 8B, since the script "Text 1" indicates the stylegroup "Title", information to render text included in the stylegroup "Title" is selected and used to form a complete set of style information to be used to render the script text.

Also, since the script "Text 2" indicates the stylegroup "Script", information to render text included in the stylegroup "Script" is selected and used to form a complete set of style information to be used to render the script text.

FIG. 8C will be used to explain a process of forming a complete set of style information required to render script text when the style is changed by the user. Since the script "Text 1" indicates the stylegroup "Title", information to render text included in the stylegroup "Title" is selected. If the style "Large" is selected by the user, selectable information that is included in the style "Large" is selected. Selectable information of the style "Large" of the stylegroup "Title" is applied to the information to render text of the stylegroup "Title" to form a complete set of the style information.

In a process of forming style information to be used for rendering the script "Text 2", since the script "Text 2" indicates the stylegroup "Script", information to render text included in the stylegroup "Script' is selected. If the style "Large" is selected by the user, selection information that is included in the style "Large" is selected. Then, the selectable information of the style "Large" of the stylegroup "Script" is applied to the information to render text of the stylegroup "Script" to form a complete set of style information.

Figure 9:
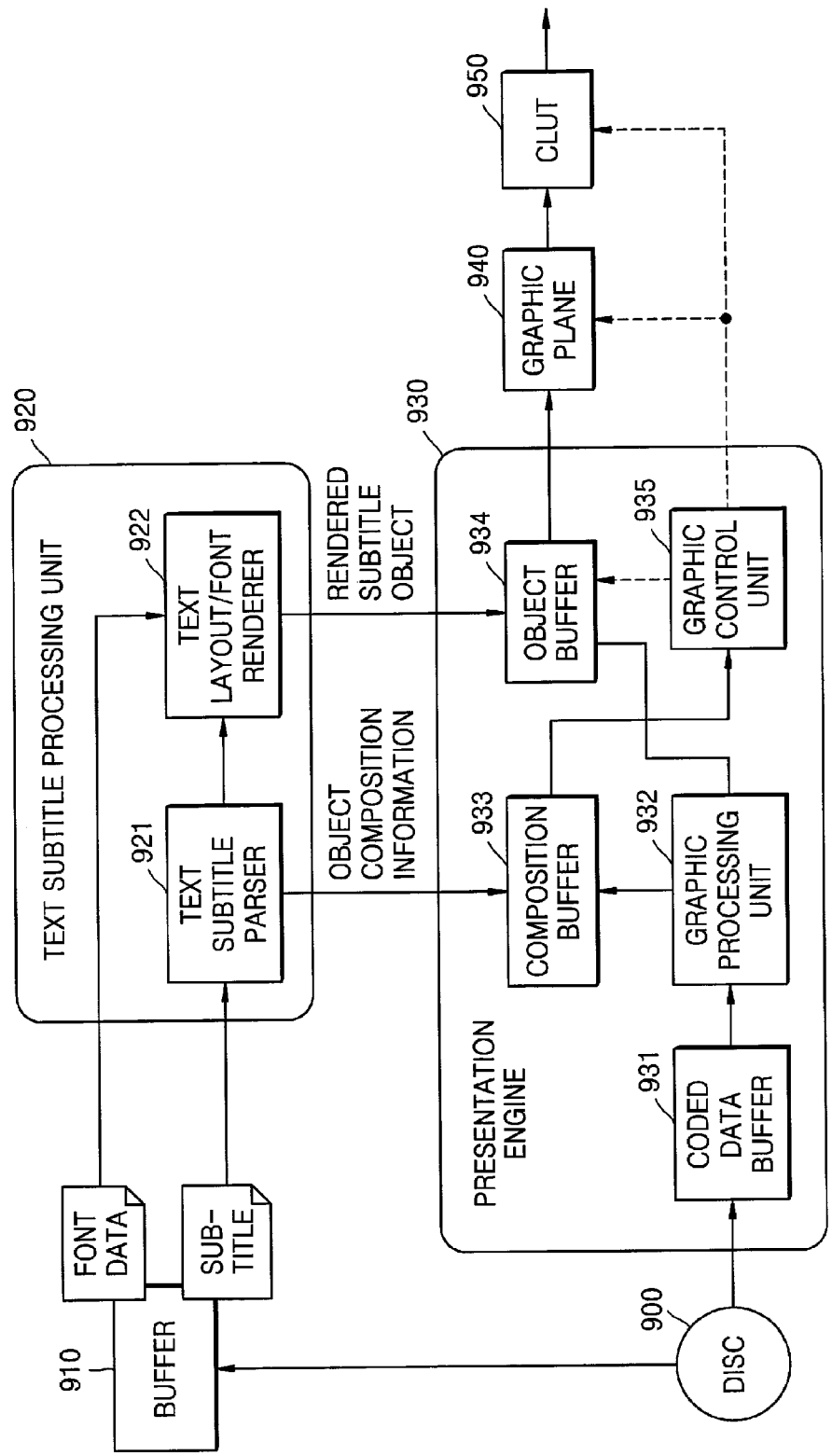
FIG. 9 is a block diagram of a text based subtitle processing apparatus according to an embodiment of the present invention.

FIG. 9 is a block diagram of a text based subtitle processing apparatus according to an embodiment of the present invention. The text based subtitle processing apparatus includes a text subtitle processing unit 920 to render text is needed. The text subtitle processing unit 920 includes a text subtitle parser 921 to extract presentation information and dialog information from a subtitle, and a text layout/font renderer 922 to generate an image to be output by rendering text according to the extracted presentation information.

After text based subtitle information and font information are read from a disc 900 and stored in a buffer 910, the subtitle is transmitted to the text subtitle parser 921 of the subtitle processing unit 920, and presentation information and dialog information are extracted. The extracted information is transmitted to the text layout/font renderer 922 and a composition buffer 933 of a presentation engine 930. The text layout/font renderer 922 generates an image to be displayed on a display apparatus by rendering text using the transmitted style information and font information, and transmits the image to an object buffer 934 included in the presentation engine 930.

The subtitle in the form of a bitmap image, is read from the disc 900, input to a coded data buffer 931, processed by a graphic processing unit 932, and transmitted to the composition buffer 933 and the object buffer 934. The composition buffer 933 receives the object composition information transmitted by the text subtitle parser 921 and the bitmap subtitle data processed by the graphic processing unit 932, and transmits control information for screen output to the graphic control unit 935. The object buffer 934 combines the bitmap subtitle data processed by the graphic processing unit 932 and the rendered text subtitle object received from the text layout/font renderer 922, generates a graphics plane 940 and outputs the graph plane 940 to the display apparatus by referring to a color lookup table (CLUT) 950.

Figure 10:
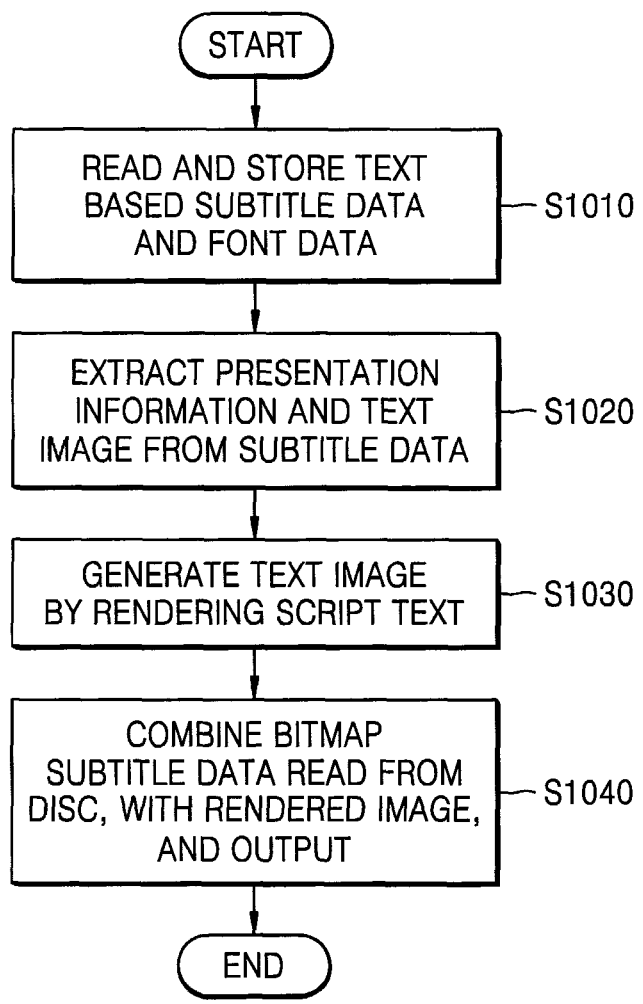
FIG. 10 is a flowchart illustrating a text based subtitle processing method according to an embodiment of the present invention.

FIG. 10 is a flowchart illustrating a text based subtitle processing method according to an embodiment of the present invention. Text based subtitle data and font data are read from a disc and stored in a buffer in operation S1010. The subtitle data, which is in the form of a bitmap image, is transmitted to a presentation engine. Presentation information and dialog information are extracted from the stored subtitle data in operation S1020. The presentation information and dialog information are as described above. By using the extracted presentation information and dialog information, text is rendered and an image is generated in operation S1030. The subtitle data, which is in the form of a bitmap image transmitted to the presentation engine and the rendered and generated image are combined and output in operation S1040. The combination of the bitmap data and the rendered image is as described above with reference to FIG. 9.

Described above is forming a style to render text of a text subtitle having a text format and outputting the text on a screen in order to display scripts to move pictures. In the present invention, a plurality of styles that may be selected by a user are provided by a producer, and when a script is output, the user selects one of the plurality of styles to change the output style of the script. Accordingly, a styleset, stylegroups, and styles of the present invention may further include fields to record information required for provided scripts of moving pictures. That is, the styleset described in the present invention includes only the stylegroups, but in addition to the stylegroup, a field to record additional data such as information to indicate style information may be added, and the stylegroups and styles described in the present invention may also have additional fields. Also, the position of each field included in the stylegroup and the style may be changed according to implementation of a text subtitle.

The present invention may also be embodied as computer readable code on a computer readable recording medium. The computer readable recording medium may be any data storage device that may store data which may be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code is stored and executed in a distributed fashion.

According to the present invention as described above, the output style of a subtitle is defined by a stylegroup and a style included in a stylegroup, and each sentence of a movie script specifies a predefined stylegroup or style such that the amount of data for a subtitle and the amount of data to be processed when the subtitle is output may be greatly reduced.

Also, by specifying the output format of a subtitle as a stylegroup or a style, the output format cannot be completely changed by a user, and the intention of a producer may be effectively reflected. Also, a style or a stylegroup may be selected by a user such that the user may select a desired output style.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-transitory information storage medium encoded with instructions for a reproducing apparatus to output a subtitle using information provided by the information storage medium, the information storage medium comprising:
    a first region configured to store a dialog set which comprises text information of the subtitle; and
    a second region configured to store a style set which comprises a first style information which is used to render the text information via the reproducing apparatus and a second style information which comprises at least one value which is used to change the first style information,
    wherein the first style information comprises an identifier to identify the first style information, and
    the dialog set further comprises information indicating the identifier of the first style information, and
    the at least one value included in the second style information is added to at least one value included in the first style information.

2. The non-transitory information storage medium of claim 1, wherein the first style information is changed by a user's selection.

3. The non-transitory information storage medium of claim 1, wherein the first style information is changed by adding the at least one value included in the second style information to at least one value included in the first style information or subtracting the at least one value included in the second style information from the at least one value included in the first style information.

4. A non-transitory information storage medium encoded with instructions for a reproducing apparatus to output a subtitle using information provided by the information storage medium, the information storage medium comprising:
    a first region configured to store a dialog set which comprises text information of the subtitle; and
    a second region configured to store a style set which comprises a first style information which is used to render the text information via the reproducing apparatus and a plurality of second style information which comprises at least one value which is used to change the first style information,
    wherein the first style information comprises an identifier to identify the first style information, and
    the dialog set further comprises information indicating the identifier of the first style information, and
    the at least one value included in the plurality of second style information is added to at least one value included in the first style information.

5. The non-transitory information storage medium of claim 4, wherein the first style information is changed by a user's selection.

6. The non-transitory information storage medium of claim 4, wherein the first style information is changed by adding the at least one value included in the plurality of second style information to at least one value included in the first style information or subtracting the at least one value included in the plurality of second style information from the at least one value included in the first style information.

7. A reproducing apparatus for reproducing a subtitle from an information storage medium storing a style set and a dialog set, the reproducing apparatus comprising:
    a reading unit which reads the style set and the dialog set from the information storage medium; and
    a rendering unit which renders the subtitle by using the style set and the dialog set,
    wherein the dialog set comprises text information of the subtitle,
    the style set comprises a first style information which is used to render the text information via the reproducing apparatus and a second style information which comprises at least one value which is used to change the first style information,
    the first style information comprises an identifier to identify the first style information, and
    the dialog set further comprises information indicating the identifier of the first style information, and
    the rendering unit renders the text information by using at least one value generated by adding the at least one value included in the second style information and at least one value included in the first style information.

8. The apparatus of claim 7, wherein the first style information is changed by a user's selection.

9. The apparatus of claim 7, wherein the first style information is changed by adding the at least one value included in the second style information to at least one value included in the first style information or subtracting the at least one value included in the second style information from the at least one value included in the first style information.

10. A reproducing apparatus for reproducing a subtitle from an information storage medium storing a style set and a dialog set, the reproducing apparatus comprising:
    a reading unit which reads the style set and the dialog set from the information storage medium; and
    a rendering unit which renders the subtitle by using the style set and the dialog set,
    wherein the dialog set comprises text information of the subtitle,
    the style set comprises a first style information which is used to render the text information via the reproducing apparatus and a plurality of second style information which comprises at least one value which is used to change the first style information,
    the first style information comprises an identifier to identify the first style information, and
    the dialog set further comprises information indicating the identifier of the first style information, and
    the rendering unit renders the text information by using at least one value generated by adding the at least one value included in one of the plurality of second style information and at least one value included in the first style information.

11. The apparatus of claim 10, wherein the first style information is changed by a user's selection.

12. The apparatus of claim 10, wherein the first style information is changed by adding the at least one value included in the plurality of second style information to at least one value included in the first style information or subtracting the at least one value included in the plurality of second style information from the at least one value included in the first style information.

* * * * *